United States Patent [19]
Wentorf, Jr. et al.

[11] 3,918,219
[45] *Nov. 11, 1975

[54] CATALYST SYSTEMS FOR SYNTHESIS OF CUBIC BORON NITRIDE

[75] Inventors: Robert H. Wentorf, Jr., Schenectady; William A. Rocco, Scotia, both of N.Y.

[73] Assignee: General Electric Company, Schenectady, N.Y.

[ * ] Notice: The portion of the term of this patent subsequent to July 3, 1990, has been disclaimed.

[22] Filed: Apr. 16, 1973

[21] Appl. No.: 351,338

Related U.S. Application Data

[62] Division of Ser. No. 158,710, July 1, 1971, abandoned.

[52] U.S. Cl. .................... 51/307; 51/293; 264/332; 423/290
[51] Int. Cl.² . B24D 3/02; C04B 31/16; C09C 1/68; C09K 3/14
[58] Field of Search .............. 423/290; 51/307, 293; 106/43, 44; 264/332

[56] References Cited
UNITED STATES PATENTS

| | | | |
|---|---|---|---|
| 3,136,615 | 6/1964 | Bovenkerk et al. | 106/43 |
| 3,212,852 | 10/1965 | Bundy | 51/307 |
| 3,233,988 | 2/1966 | Wentorf et al. | 423/290 |
| 3,317,035 | 5/1967 | Cannon | 423/446 |
| 3,743,489 | 7/1973 | Wentorf et al. | 51/307 |
| 3,744,982 | 7/1973 | Bovenkerk et al. | 51/307 |
| 3,768,972 | 10/1973 | Taylor et al. | 423/290 |

OTHER PUBLICATIONS

Synthesis of Boron Nitride — Saito et al. — Journal of the Ceramic Society of Japan — V78, N. 893 — 1970.

*Primary Examiner*—Oscar R. Vertiz
*Assistant Examiner*—Eugene T. Wheelock
*Attorney, Agent, or Firm*—Jane M. Binkowski; Joseph T. Cohen; Jerome C. Squillaro

[57] ABSTRACT

Certain aluminum alloys have been found to be effective catalysts for the synthesis of cubic boron nitride from hexagonal boron nitride. Nickel/aluminum and cobalt/aluminum alloys in particular are very effective catalysts. Composite cubic boron nitride/cemented carbide tool inserts have been prepared utilizing these teachings.

8 Claims, 8 Drawing Figures

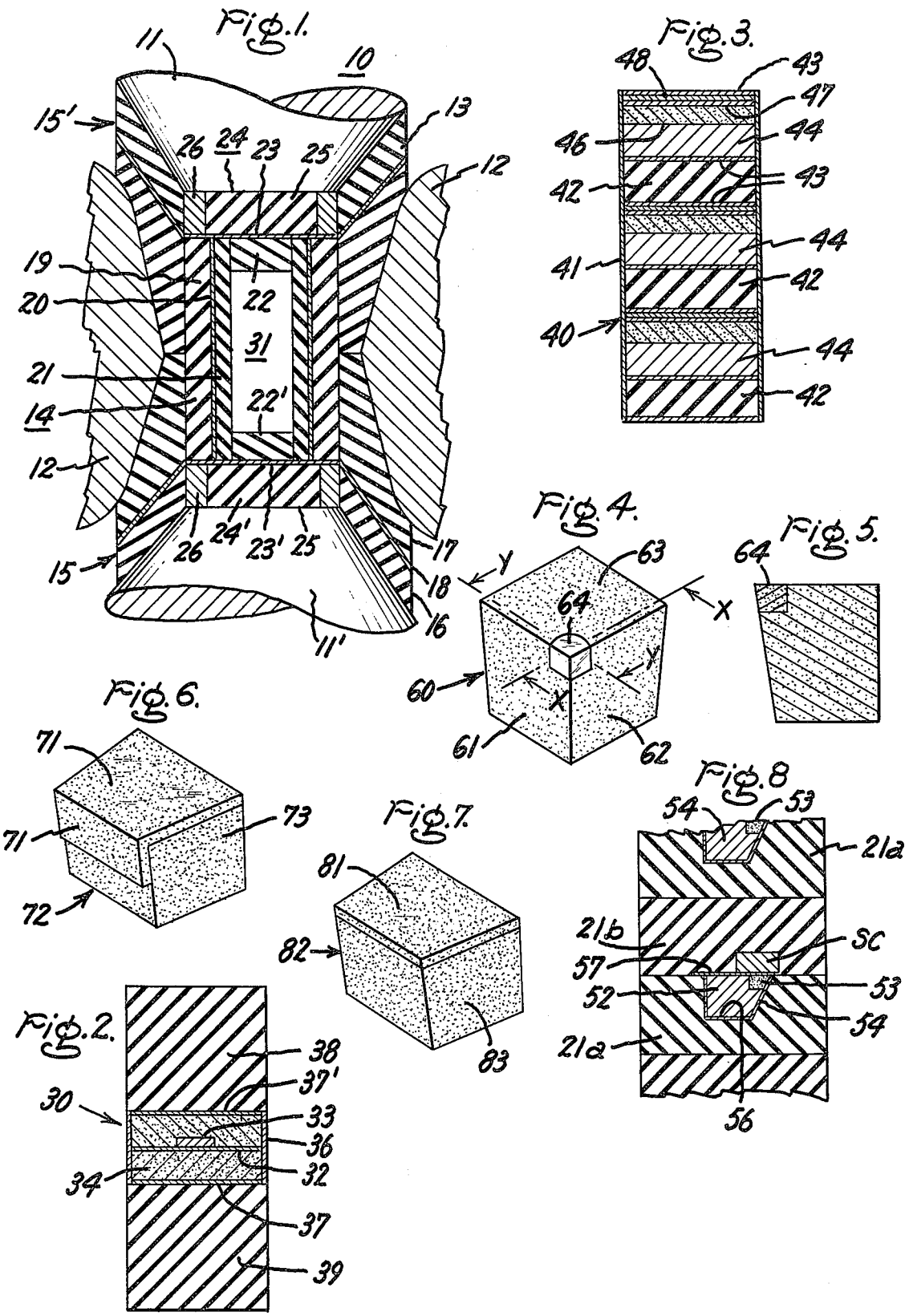

3,918,219

CATALYST SYSTEMS FOR SYNTHESIS OF CUBIC BORON NITRIDE

This is a division of application Ser. No. 158,710, now abandoned, filed July 1, 1971.

BACKGROUND OF THE INVENTION

The method of converting hexagonal boron nitride (hexagonal BN) to cubic boron nitride (CBN) employing at least one catalyst selected from the class consisting of alkali metals, alkaline earth metals, lead, antimony, tin and nitrides of these metals is described in U.S. Pat. No. 2,947,617 — Wentorf, Jr. This patent is incorporated by reference.

The use of $Fe_3Al$ and certain silver-cadmium alloys as catalysts in the conversion of hexagonal BN to CBN has been described in "Synthesis of Cubic Boron Nitride" by Saito et al. (Yogyo-Kyokai Shi, Vol. 78, No. 893).

SUMMARY OF THE INVENTION

Aluminum alloys of cobalt, nickel and manganese have been found to be useful catalysts for the conversion of hexagonal BN to the CBN form at high pressure and high temperature. The habit and size of the CBN crystals developed depends on whether hexagonal BN or a mixture of hexagonal BN and CBN crystals (or sintered carbide grains) is employed with the catalyst metal.

BRIEF DESCRIPTION OF THE DRAWING

This invention will be better understood from the following description and drawing in which:

FIG. 1 illustrates one exemplary high pressure, high temperature apparatus useful in the practice of this invention;

FIG. 2 illustrates in section one form of charge assembly configuration for use within the apparatus of FIG. 1 in the practice of the instant invention;

FIG. 3 illustrates in section a charge assembly configuration for use within the apparatus of FIG. 1 for the preparation of a tool insert;

FIG. 4 is a three-dimensional view illustrating a composite CBN/cemented carbide material tool insert;

FIG. 5 is a section taken through the insert of FIG. 4 either on line XX or on line YY;

FIGS. 6 and 7 are each three-dimensional views of composite CBN/sintered carbide machine tool inserts prepared according to this invention and FIG. 8 is a sectional view showing a combined liner/-charge assembly for preparing the structures of FIGS. 4, 6, and 7.

BRIEF DESCRIPTION OF THE PREFERRED EMBODIMENT

One preferred form of a high pressure, high temperature apparatus in which the instant invention may be practiced is the subject of U.S. Pat. No. 2,941,248 — Hall (incorporated by reference) and is briefly illustrated in FIG. 1.

Apparatus 10 includes a pair of cemented tungsten carbide punches 11 and 11' and an intermediate belt or die member 12 of the same material. Die member 12 includes an aperture 13 in which there is positioned a reaction vessel 14. Between punch 11 and die 12 and between punch 11' and die 12 there are included gasket/insulating assemblies 15, 15', each comprising a pair of thermally insulating and electrically non-conducting pyrophyllite members 16 and 17 and an intermediate metallic gasket 18.

Reaction vessel 14 in one preferred form, includes a hollow salt cylinder 19. Cylinder 19 may be of other material, such as talc, which (a) is not converted during high pressure-high temperature operation to a stronger, stiffer state (as by phase transformation and or compaction) and (b) is substantially free of volume discontinuities occurring under the application of high temperatures and pressures, as occurs, for example, with pyrophyllite and porous alumina. Materials meeting the criteria set forth in U.S. Pat. No. 3,030,662 — Strong (column 1, lines 59 through column 2, line 2, incorporated by reference) are useful for preparing cylinder 19.

Positioned concentrically within and adjacent cylinder 19 is a graphite electrical resistance heater tube 20. Within graphite heater tube 20 there is in turn concentrically positioned the cylindrical salt liner 21. The ends of liner 21 are fitted with salt plugs 22, 22', disposed at the top and bottom, respectively. As will be described hereinbelow liner 21 may have a cylindrical hollow core to receive one large charge assembly containing sub-assemblies or the liner may consist of a series of mold assemblies arranged in a stack for the preparation of a plurality of composite tool inserts, e.g. as shown in FIGS. 4, 6, and 7.

Electrically conductive metal end discs 23 and 23' are utilized at each end of cylinder 19 to provide electrical connection to graphite heater tube 20. Adjacent each disc 23, 23' is an end cap assembly 24 and 24' each of which comprises a pyrophyllite plug or disc 25 surrounded by an electrical conducting ring 26.

Operational techniques for simultaneously applying both high pressures and high temperatures in this apparatus are well known to those skilled in the superpressure art. The foregoing description relates to merely one high pressure, high temperature apparatus. Various other apparatuses are capable of providing the required pressures and temperatures thay may be employed within the scope of this invention.

An exemplary charge assembly 30 for the conversion of hexagonal BN to CBN is shown schematically in FIG. 2. In the arrangement of materials shown the aluminum alloy forms in situ during the high pressure, high temperature conditions generated by means of the apparatus 10 to establish CBN — stable conditions. Charge assembly 30, although not illustrated to the same scale, fits within volume 31 of the apparatus of FIG. 1.

In the arrangement shown disc 32 of cobalt, nickel or manganese, together with smaller disc 33 of aluminum, is surrounded by relatively pure hexagonal BN charge 34.

Pre-formed alloys (e.g. 13 weight % Al, 87 weight % Ni) may, of course, be used in place of separate discs. The ratio of Al to specific alloying metal is preferably in the range of from 1 part by weight of Al per 2 parts by weight of alloying metal to 1 part by weight of Al per 100 parts by weight of alloying metal. The catalyst alloy metals or pre-formed alloy may also be used as a powder mixed with the hexagonal BN.

These components are enclosed in cylindrical sleeve 36 with shielding discs 37, 37' completing the enclosure. Sleeve 36 and discs 37, 37' are made of metals selected to prevent the entry of, and to remove, oxygen. Appropriate metals for these purposes are set forth below in the description of FIG. 3. The plugs 38, 39 of the same material as cylinder 19 occupy the balance of the volume required to fill space 31.

EXAMPLE I

The arrangement shown in FIG. 2 was used wherein disc 32 was of cobalt metal. The hexagonal BN was baked for an hour at 900°C in ammonia before being loaded into the assembly. This was done to minimize oxygen in the system. After exposure to about 55 kb and 1500°C for 60 minutes, heating was stopped and pressure was reduced to ambient. CBN crystals had been formed clustered around the region in which the cobalt and aluminum had alloyed. These crystals were identified as cubic boron nitride by X-ray diffraction. The crystals were brown in color measuring from about 10 to 100 micrometers in largest dimension. The habit of crystal growth was generally columnar and the crystals were often intergrown.

In the following examples, where reference is made to the results of a wear test, the test consisted of pressing a 0.125 inch diameter rod of Rene′41 (a nickel-base superalloy) rotating at 2000 rpm against the CBN compact. The depth of the wear scar worn into the CBN was then measured.

EXAMPLE II

A Mo cup (0.002 inch thick × 0.250 inch in diameter) was loaded with a mixture of powders (0.050 g hexagonal BN, 0.003 g Al and 0.014 g of WC) and a Co disc (0.034 g) and then covered with a Mo disc (0.002 inch thick). The assembly was subjected to the simultaneous application of a pressure of 54 kb and a temperature of 1550°C for 70 minutes. All the hexagonal BN was transformed to CBN making a hard, strong mass of intergrown columnar crystals.

EXAMPLE III

The specific arrangement shown in FIG. 2 was employed. Sleeve 36 of Mo (0.250 inch in diameter) and discs 37, 37′ of Mo (0.002 inch thick) served as the enclosure. Disc 33 was a chip (∼ 0.020 g) of Inconel 718 having the composition (by weight):

| | |
|---|---|
| 52.5% Ni | 0.6% Al |
| 0.2% Mn | 19% Cr |
| 18% Fe | 3% Mo |
| 5.2% Cb | 0.8% Ti |

An Mo disc (0.002 inch thick) was used for disc 32. The assembly was simultaneously subjected to 54 kb and 1500°C for 60 minutes. Heating was stopped and pressure was reduced to ambient. The Inconel had melted and had alloyed with the Mo disc. A layer of CBN crystals grew around the alloyed metals. These crystals were dark, dentritic crystals ranging up to 0.1 mm in size.

EXAMPLE IV

An enclosure formed of an Mo sleeve (0.070 inch long and 0.250 inch in diameter) and a pair of Mo cover discs (0.002 inch thick) was filled with two masses of hexagonal BN separated by a Co disc (0.005 inch thick, 0.034 g) and an Al ring (0.246 inch OD, 0.188 ID, 0.005 inch thick weighing 0.005 g) in contact therewith. The assembly was simultaneously subjected to 55 kb and 1550°C for 60 minutes. It was found that lumps of polycrystalline CBN formed on the Co near the Al. The CBN scratched a $B_4C$ test block and was further identified by X-ray diffraction.

EXAMPLE V

An enclosure formed of Mo sleeve (0.250 inch diameter) and Mo end caps was loaded with a mass of hexagonal BN (0.040 g), a Ni disc (0.034 g) and an Al disc (0.004 g) of smaller area disposed over the Ni disc and against one wall of the enclosure. This assembly was simultaneously subjected to 54 kb and 1550°C for 59 minutes. Most of the hexagonal BN transformed to CBN. Columnar and dendritic grains, which had formed, could be split apart from each other.

EXAMPLE VI

A Mo cup closed off with a Mo cover (0.002 inch thick) was used as the enclosure. A mixture of hexagonal BN (0.040 g) and $NiAl_3$ (0.008 g) powders in the form of a cold-pressed pill was fired in $NH_3$ for 1 hour at 980°C and then loaded into the enclosure together with three thin Co discs (total 0.180 g) that had been fired in $H_2$ at 700°C for 1 hour. This assembly was subjected to the simultaneous application of 54 kb and 1580°C for 70 minutes. It was found that most of the hexagonal BN had changed to CBN of fine grain size (30μ maximum dimension) interwoven with a metal phase. Wear test scar — 650 micro-inch deep.

EXAMPLE VII

An enclosure formed of a Mo sleeve (0.250 inch in diameter) and Mo end caps (0.002 inch thick) was loaded with a layer of hexagonal BN (0.030 g) in contact with a layer of coarse (60–100 mesh) metal powders (0.005 g Al, 0.025 g Mn). The assembly was simultaneously subjected to 54 kb and 1480°C for 61 minutes. Upon examination it was found that black crusty masses of CBN had grown from the hexagonal BN next to the Al-Mn alloy.

EXAMPLE VIII

An enclosure identical to that employed in EXAMPLE VII was used. The enclosure was loaded with two layers of hexagonal BN separated by a disc (0.034 g) of 87 Ni 13 Al alloy. The assembly was subjected simultaneously to 55 kb and 1570°C for 119 minutes. It was found that the hexagonal BN was completely converted to a mass of dentric interlocked columnar CBN crystals.

EXAMPLE IX

A Zr cup (0.002 inch thick × 0.250 inch in diameter) closed off with a Mo top cover disc (0.002 inch thick) was used as the enclosure. Two separate layers of hexagonal BN separated by a layer (0.050 inch thick) of 883 grade Carboloy (93% WC, 6% Co) sintered carbide were loaded into the enclosure. An Al ring (0.005 inch thick, 0.188 inch ID, 0.246 inch OD) was disposed into contact with the upper layer of hexagonal BN and in contact with the adjacent surface of the carbide layer. A few small lumps of Al (total weight 0.004 g, 60 mesh material) were located in contact with the lower hexagonal BN and in contact with the adjacent surface of the carbide layer. The assembly was simultaneously subjected to 54 kb and 1500°C for 60 minutes. It was found that a large central patch of CBN grew on the upper face of the carbide layer inside the Al ring. This mass was polished and examined; the CBN crystals were intergrown and dentritic in crystal habit. Wear test scar — 350 micro-inch deep. Lumps of polycrystalline CBN also grew on the bottom face of the sintered carbide layer at the locations of the Al lumps.

The amount of aluminum in the starting material may range from about 2 to about 40% by weight of hexagonal BN while the range of the alloying metal (nickel, cobalt, manganese) may range from about 4 to about 100% by weight of hexagonal BN. The amount of these alloying metals remaining in the consolidated CBN as matrix material will vary depending upon the pressure and length of application of high pressure/high temperature conditions. In any event the quantity of aluminum plus alloying metal atoms in the compacted CBN will be in excess of about 1% by weight of CBN. Pre-formed aluminum alloys may, of course, be used in place of separate discs for alloying in situ.

Pure aluminum or pure Co, Ni or Mn have been found not to function alone as catalyst for the conversion of hexagonal BN to CBN.

FIG. 3 illustrates an arrangement wherein this invention is applied to the production of a plurality of disc-or pill-shaped composites (sintered carbide substrate with a layer of sintered CBN formed thereover and bonded thereto). As in the case of charge assembly 30, charge assembly 40 fits within space 31 of the apparatus of FIG. 1.

Charge assembly 40 as shown consists of cylindrical sleeve 41 of shield metal to prevent the entry of and remove oxygen. The shield metal is selected from the group consisting of zirconium, titanium, tantalum, tungsten and molybdenum. Within cylindrical shield metal sleeve 41 are disposed a number of sub-assemblies separated by discs 42 made of material such as is used for cylinder 19. The sub-assemblies are protected above and below by shielding discs 43 made of titanium, zirconium, molybdenum, tantalum or tungsten. Each sub-assembly so protected on all sides consists of larger mass 44 and smaller mass 46 and metal discs 47, 48. Each mass 46 is largely or completely made up of hexagonal BN. The habit and size of crystals developed from the hexagonal BN may be altered by mixing CBN particles (1–10 micrometers, for example) or Carboloy carbide powders (1–5 micrometers) with the hexagonal BN. Preferably the hexagonal BN is treated to remove oxygen therefrom.

Each mass 44 consists of a sintered carbide disc preferably prepared from a mixture of tungsten carbide powder and cobalt powder. If desired, sinterable carbide powder can be used in which case the sintered carbide is made in situ during preparation of the CBN/sintered carbide composite.

As shown, one of metal discs 47, 48 is aluminum and the other disc is cobalt, nickel or manganese. By subjecting these sub-assemblies to simultaneous pressures and temperatures in the cubic boron nitride-stable region of the boron nitride phase diagram, the hexagonal BN is converted to CBN forming an abrasive compact integral with a sintered carbide support block therefor.

When substantially pure hexagonal BN alone is used for mass 46, the CBN crystals that form in a layer bonded to the sintered carbide tend to be in the form of slender dendrites about 10–20 micrometers in diameter and about 50–100 micrometers in length. Where the CBN crystals so formed are not interlocked by virtue of their dendritic habit, the crystals are strongly bonded together by metal from the discs 47, 48 and from the mass 44.

The appearance of a polished section of a CBN compact wherein the crystals have been grown in situ as in the instant application differs from a polished section of a CBN compact made from pre-formed CBN crystals. In the former case the crystals appear elongated predominantly in a single direction (columnar) and may also have branching extensions (dendritic). In the latter case the crystals are blockier. Thus, in the former case the length-to-width ratio for the crystals is predominantly greater than 1.5:1 while in the latter case the length-to-width ratio is predominantly less than 1.4:1.

When finely divided strong, hard crystalline material (e.g. CBN, WC, $Al_2O_3$, $Si_3N_4$ etc.) a) that remains solid at operating pressures and temperatures and b) has a thermal expansion coefficient approximating that of CBN is mixed with the hexagonal BN to form mass 46, the developing CBN crystals grow in the 2–10 micrometer range (largest dimension) and tend to be columnar or blocky. The crystalline mass is free of voids, the interstices between CBN crystals being filled with metal and/or the crystalline fines, when used. Bonding of the crystals to each other and to the sintered carbide is predominantly due to metal from the alloying of discs 47, 48 and from mass 44 and, when used, to sintered carbide powder.

Although the arrangement therefor is not shown in the drawing, composites have been made using a subassembly consisting of a sintered carbide disc with a thin aluminum (or aluminum alloy) washer or disc in contact with the upper surface thereof, this combination of materials being covered with a mass of hexagonal BN without additional catalyst metal being present. It was found that cobalt from the sintered carbide was made available in sufficient amount in combination with the aluminum washer or disc to supply the requisite catalyst alloy system. Similarly, powdered carbide powder mix (carbide plus sintering agent) may be used in this arrangement in place of the pre-sintered carbide.

In the case of the sub-assembly shown in FIG. 3, cobalt from the mass 44 becomes available at the interface between mass 44 and the CBN crystals formed in mass 46 entering into a complex matrix system providing an excellent bond between the CBN formed and the sintered carbide.

The direct bonding relationship created in situ between the newly-formed very high strength CBN material and the significantly larger mass of underlying stiff support material obviates any need for the interposition of any bonding layer therebetween, as for example results from brazing or soldering. By providing stiff, non-yielding support material in direct contact with the CBN-rich machining edge region, the incidence of fractures in the CBN material is greatly minimized, and bonding of the composite to another body, e.g. a tool shank, is facilitated.

Composites prepared in accordance with this invention have at times been accidentally broken during decompression of the reaction vessel to recover the product. This type of breakage occurs in a direction generally perpendicular to the vertical axis of the charge assembly. In the case of the composites produced with the subassemblies of FIG. 3 the interface between the CBN and the sintered carbide lies in this same direction. The high quality of the bond at this interface is shown by the fact that most usually the breakage occurred through the CBN layer. Only rarely did breakage occur at the interface and in these instances the breakage surface was irregular, passing through the CBN and through the sintered carbide as well as along the interface. Thus, the interface is in general stronger than the tensile strength of the CBN crystals.

Microscopic (300X) examination of the polished edges of composites shaped into tool inserts has shown the reasons for this unusually strong interface bond. In "good bonding" the CBN grains at the interface appear (at 300X magnification) either to be in direct contact with the sintered carbide or to have a thin reaction layer disposed between the CBN grains and the sintered carbide. Any reaction layer present is less than 10 micrometers thick indicating that in any case minimal disruption of, and attack on, the sintered carbide structure occurs. The interface is free of voids and is irregular on the scale of micrometers (1–100$\mu$) due to pushing of the CBN into the sintered carbide and/or because of the movement of plastically deformed sintered carbide into interstices between adjacent CBN crystals. This type and quality of interlocked interface is clearly unattainable by soldering of a pre-formed CBN compact to a sintered carbide disc.

In the preparation of tool inserts by the instant process the charge assembly 30 (or 40) is placed in the apparatus 10, pressure is applied thereto and the system is then heated. The temperatures employed are in the range from about 1300°–1600°C for periods of time in excess of about 3 minutes in order to sinter the carbide/cobalt mixture while at the same time the system is subjected to very high pressure e.g. of the order of 50 kilobars to insure thermodynamically stable conditions for the formation of CBN from hexagonal BN. At 1300°C the minimum pressure should be about 40 kb and at 1600°C the minimum pressure should be about 50 kb.

The carbide powder employed either to prepare a pre-sintered mass 44, or as the mass 44 itself, is preferably a tungsten carbide molding powder (mixture of carbide powder and cobalt powder) commercially available in particle sizes of from 1 to 5 micrometers. The tungsten carbide may, if desired, be replaced in whole or in part by either or both of titanium carbide and tantalum carbide. Since some use of nickel and iron has been made in the bonding of carbides, the material for providing the metal bond in the cemented carbide may be selected from the group consisting of cobalt, nickel, iron and mixtures thereof. Cobalt, however, is preferred as the metal bond material. Aluminum alloys of all three of the aforementioned metals function as catalyst-solvents for CBN synthesis in the preparation of the CBN/sintered carbide composites for tools. The composition of carbide molding powders useful in the practice of this invention may consist of mixtures containing about 75–97% by weight carbide and about 3–25% by weight cobalt.

In the following examples, where reference is made to the results of a wear test, the test consisted of pressing a 0.125 inch diameter rod of Rene' 41 rotating at 2000 rpm against the CBN layer of the CBN/sintered carbide composition. The depth of the wear scar worn into the CBN was measured and reported.

EXAMPLE X

An Mo cup (0.250 inch diameter) was loaded with a mixture of jet-milled CBN crystals (1–10 $\mu$ — 0.017 g), hexagonal BN (0.050 g) and NiAl$_3$ (30$\mu$ particles — 0.013 g) under a disc (0.050 inch thick) of grade 883 Carboloy sintered carbide. Before being loaded into the Mo cup the above mixture was fired in NH$_3$ at 820°C for 1 hour. The assembly was simultaneously subjected to 55 kb and 1550°C for 69 minutes. A composite was formed and in the mass affixed to the carbide disc it was found that an intimate mixture of metal and CBN grains had been produced. The CBN grains were predominantly smaller than 40 micrometers. The composite took a good polish. Wear test scar — 900 micro-inch deep.

EXAMPLE XI

An Mo cup (0.002 inch thick × 0.250 inch diameter) was loaded with a mixture of powders consisting of hexagonal BN (0.051 g), grade 883 Carboloy powder (0.033 g), aluminum (0.005 g) and nickel (0.010 g) under a disc (0.050 inch thick) of grade 883 Carboloy sintered carbide. The assembly was subjected to the simultaneous application of 54 kb and 1500°C for 124 minutes. A composite body was found in which a strong mass of CBN grains had been formed well-bonded to the carbide disc. The CBN grains tended to be columnar but much smaller than in experiments lacking the carbide powder addition. The CBN grains were firmly held in a metallic matrix. Wear test scar — 500 micro-inch deep.

EXAMPLE XII

A Zr cup (0.002 inch thick × 0.350 inch in diameter) was loaded with a powdered mixture consisting of hexagonal BN (0.100 g) and NiAl$_3$ (0.020 g) topped by a disc (0.115 inch thick) of grade 883 Carboloy sintered carbide. Before being loaded into the Zr cup the powdered mixture had been cold-pressed into the pill form and fired in NH$_3$ at 900°C for 1 hour. The assembly was simultaneously subjected to 54 kb and 1500°C for 62 minutes. It was found that nodules of CBN had grown on the carbide disc from the hexagonal BN/NiAl$_3$ mixture.

EXAMPLE XIII

A Mo cup (0.002 inch thick × 0.250 inch diameter) was loaded with a powdered mixture (−325 mesh) consisting of hexagonal BN (0.050 g), Co (0.012 g), W (0.003 g), Al (0.003 g) under a disc (0.050 inch thick) of grade 883 Carboloy sintered carbide. The assembly was subjected to the simultaneous application of 54 kb and 1460°C for 120 minutes. A sintered strong composite mass was obtained that polished well. The CBN portion consisted of small grains, e.g. less than 30 micrometers) of CBN with thin metallic layers between them. Wear test scar — 400 micro-inch deep.

EXAMPLE XIV

An Mo cup (0.350 inch diameter) was loaded with a mixture of powders consisting of hexagonal BN (0.100 g), Ni$_2$Al$_3$ (0.010 g) and Mo (0.007 g) under a disc (0.120 inch thick) of grade 883 Carboloy sintered carbide. The powders had been cold-pressed into pill form and fired in hydrogen at 800°C for 1 hour before being introduced into the Mo cup. The assembly was subjected to the simultaneous application of 55 kb and 1500°C for 70 minutes. A composite was found in which a strong hard mass adhered to the carbide. The composite polished well. The hard mass consists of fine CBN crystals in a metallic matrix.

EXAMPLE XV

An enclosure consisting of an Mo sleeve (0.001 inch thick × 0.250 inch diameter) together with an Mo disc (0.002 inch thick) was loaded with a Ni disc (0.034 g), an Al disc (0.004 g) contiguous with the nickel disc, a disc (0.050 inch thick) of grade 883 Carboloy sintered carbide and a mixture consisting of hexagonal BN (0.025 g) plus CBN crystals (1–10$\mu$ — 0.025 g) disposed as a mass between the sintered carbide disc and the pair of metal discs. The assembly was subjected to the simultaneous application of 55 kb and 1550°C for 60 minutes. A composite was found consisting of a hard mass firmly bonded to the carbide layer. The hard mass consists of somewhat columnar form CBN crystals held in a metallic matrix. Wear test scar — 1200 micro-inch deep.

Referring now to the composite tool inserts shown in FIGS. 4, 6 and 7, in the preparation of these non-circular shapes a modified construction of salt liner 21 and plugs 22, 22' is required. Thus, the structure fitting within heater tube 20 may be formed as a series of cylindrical blocks in stacked cooperating arrangement to provide molds to be filled with a preformed sintered carbide body 52 (or with the powder constituents therefor), mass 53 of hexagonal BN (or hexagonal BN plus CBN fines), or hexagonal BN plus carbide powder mixture and the alloy system. By way of example, in FIG. 8 salt block 21a has formed therein a recess 54 replicating the shape of the desired tool insert allowing for the thickness of the protective metal sheath 56. Recess 54 is lined with metal 56 as shown and masses 52 and 53 are properly located therein. The catalyst system for mass 53 may be supplied as a powdered mixture of aluminum and the alloying component therefor (selected from the group consisting of Co, Ni and Mn) interspersed with the hexagonal BN or as discs (not shown) at an outer surface of mass 53. Cover salt block 21b has recesses therein to accommodate cover sheet 57 completing the protective metal enclosure for the powders and, preferably, a back-up block of sintered carbide SC to minimize puncturing of the protective metal layer 57. A number of such cooperating pairs of salt blocks such as 21a, 21b may be employed with the contents described.

In the composite tool insert construction 60 of FIG. 4 both faces 61 and 62 of the cemented carbide 63 and CBN compact 64 are formed with a rake (FIG. 5) to facilitate presentation of the CBN cutting edges of CBN compact 64 to the workpiece.

In forming the thin layers 71, 81 of consolidated CBN in the tool insert constructions 72, 82 shown in FIGS. 6 and 7, the layer of CBN on the sintered carbide bodies 73, 83, respectively, is limited to a maximum thickness of about 0.060 inch (1.5 mm) and a minimum thickness of about 0.001 inch (0.025 mm) although the capability exists for preparing such layers in thicknesses as great as about 0.080 inch. The purpose of deliberately making these layers 71, 81 very thin is in order a) to present the CBN layers 71, 81 as chip breaker faces and b) to make it easier to sharpen the tool inserts 72, 82. Ideally, the relationship between the properties of the CBN layer to the cemented carbide will be such that the edge of the CBN will wear away slightly less rapidly than the cemented carbide. When this condition prevails a small amount of the CBN layer will continue to project beyond the cemented carbide body to provide a cutting edge and the amount of CBN utilized will be commensurate with the lift of the tool.

After completion of the high temperatures, high pressure process, first the temperature and then the pressure are reduced. Upon recovery of the tool insert masses the protective sheath metal remains strongly affixed to the outer surfaces thereof. Exposure of the desired surfaces of the composite tool insert is accomplished by simply grinding away the protective sheath.

Special properties can be introduced into the CBN layer by the introduction of tungsten into the system. This may be accomplished deliberately in the form of tungsten metal or as tungsten carbide addition to the hexagonal BN charge.

It is to be understood that composites produced as products in the practice of this invention will, most usually, be bonded to a larger body, e.g. a tool shank or drill bit for presentation to the material to be cut.

What we claim as new and desire to secure by Letters Patent of the United States is:

1. In the method for converting hexagonal boron nitride to cubic boron nitride wherein hexagonal boron nitride in the presence of catalyst material for the conversion thereof to cubic boron nitride is subjected to the simultaneous application of cubic boron nitride-stable pressures and temperatures, the improvement comprising:
   a. making available as the catalyst material during the conversion a quantity of at least one alloy in which aluminum is combined with at least one alloying metal selected from the group consisting of cobalt, nickel and manganese, the ratio of aluminum to alloying metal being in the range of from 1 part by weight of aluminum: 2 parts by weight alloying metal to 1 part by weight of aluminum: 100 parts by weight of alloying metal, said alloy passing through a molten phase during said conversion, and
   b. the quantity of hexagonal boron nitride to be converted is in contact as a mass with a mass selected from the group consisting of sintered carbide and sinterable carbide powder forming an interface therewith, the carbide portion of said sintered carbide or said sinterable carbide powder being predominantly of a material selected from the group consisting of tungsten carbide, titanium carbide, tantalum carbide and mixtures thereof, whereby a composite cubic boron nitride/sintered carbide body is formed in situ wherein the cubic boron nitride is strongly bonded to the sintered carbide and whereby the interface of said composite between said cubic boron nitride and said sintered carbide is interlocking, free of voids and irregular on the scale of about 1–100 micrometers.

2. The improvement in claim 1 wherein the catalyst material is formed in situ.

3. The improvement in claim 1 wherein pre-formed catalyst material is provided.

4. The improvement in claim 1 wherein the catalyst material is in powder form mixed with the hexagonal boron nitride.

5. The improvement in claim 1 wherein the hexagonal boron nitride is in contact with a pre-sintered carbide mass.

6. The improvement in claim 1 wherein the hexagonal boron nitride is in contact with a mass of sinterable carbide powder.

7. The improvement of claim 1 wherein the amount of aluminum present is in the range of from about 2 to about 40% by weight of the quantity of hexagonal boron nitride and the amount of alloying metal is in the range of from about 4 to about 100% of the quantity of hexagonal boron nitride.

8. The improvement of claim 1 wherein the hexagonal boron nitride to be converted contains an additive providing tungsten atoms.

* * * * *